(12) United States Patent
Sivalingham

(10) Patent No.: US 7,116,668 B2
(45) Date of Patent: Oct. 3, 2006

(54) METHOD FOR TIME STAMP-BASED REPLAY PROTECTION AND PDSN SYNCHRONIZATION AT A PCF

(75) Inventor: Sanjeevan Sivalingham, San Diego, CA (US)

(73) Assignee: Telefunaktiebolaget LM Ericsson (publ), (SE)

( * ) Notice: Subject to any disclaimer, the term of this patent is extended or adjusted under 35 U.S.C. 154(b) by 1041 days.

(21) Appl. No.: 09/973,421

(22) Filed: Oct. 9, 2001

(65) Prior Publication Data

US 2003/0067921 A1  Apr. 10, 2003

(51) Int. Cl.
H04L 12/28 (2006.01)

(52) U.S. Cl. .................... 370/394; 455/435.1

(58) Field of Classification Search ............ None
See application file for complete search history.

(56) References Cited

U.S. PATENT DOCUMENTS

| | | | | |
|---|---|---|---|---|
| 5,148,479 A | * | 9/1992 | Bird et al. | 713/155 |
| 2001/0022823 A1 | * | 9/2001 | Renaud | 375/359 |
| 2001/0049285 A1 | * | 12/2001 | Park et al. | 455/432 |

OTHER PUBLICATIONS

Internet Engineering Task Force, RFC 2002.
3GPP2: "Access Network Interfaces Interoperability Specification Version 2.0" 3GPP2 Draft Standard, Online! Jun. 2001, pp. 302-303, XP002233791.
Chien Hung-Yu et al: "Cryptanalysis on Dynamic Authentication Protocol for Personal Communication System" Electronics Letters, IEEE Stevenage, GB, vol. 37, No. 14, Jul. 5, 2001, pp. 895-896, XP006016820 ISSN: 0013-5194.
Perkins, C: "RFC 2002: IP Mobiliity Support" IETF RFC, Oct. 1996, XP002187650.
Sufatrio et al: "Mobile IP Registration Protocol: A Security Attack and New Secure Minimal Public-Key Based Authentication" Parallel Architectures, Algorithms, and Networks, 1999. Proceedings. Fourth International Symposium on Perth/ Fremantle, WA, Australia Jun. 23-25, 1999, Los Alamitos, CA, USA, IEEE Comput. Soc, US, Jun. 23, 1999, pp. 364-369, XP010341845 ISSN: 0-7695-0231-8.
3GPP2 Project: "Wireless IP Network Standard" 3GPP2 P.S0001-A V. 3.0, Online! Jul. 16, 2001, pp. 1-62, XP002234109.
3GPP2: "Wireless IP Architecture Based on IETF Protocols P.R001 Version 1.0.0" 3GPP2, Online! Jul. 14, 2000, pp. 1-51, XP002234110.
"Precise Synchronization of Computer Networks: Network Time Protocol (NTP) for TCP/IP" Truetime Application Note, XX, XX, No. 23, pp. 1-3, XP002909936.

* cited by examiner

*Primary Examiner*—Doris H. To
*Assistant Examiner*—Robert W. Wilson
(74) *Attorney, Agent, or Firm*—Coats & Bennett, P.L.L.C.

(57) ABSTRACT

A packet control function (PCF) exchanging messages with a packet data serving node (PDSN) in a wireless communication network guards against malicious or erroneous message replay by checking the "reasonableness" of PDSN time stamps in registration messages it receives over its PDSN interface. Received messages that are too old are rejected by the PCF, even if otherwise valid. A configurable time threshold may be set at the PCF that determines the allowable maximum age of a received message. Further, because messages received from the PDSN contain echoed identifier values generated by the PCF, the PCF may implement identifier value function generation that insures no repeated identifier values over a desired interval. The desired interval is set larger than the allowable message age to further guard against attempted message replay.

31 Claims, 5 Drawing Sheets

METHOD FOR TIME STAMP-BASED REPLAY PROTECTION AND PDSN SYNCHRONIZATION AT A PCF

BACKGROUND OF THE INVENTION

The present invention generally relates to high data rate wireless communication networks and particularly relates to security and authentication procedures for high data rate wireless communication networks.

The Internet provides access to information resources worldwide. Users typically gain access to the Internet from a fixed station located in the home, office, school, or other location. Laptop computers and other portable computing devices provided a first step toward mobile Internet access by allowing the user to connect to the Internet through any connection point offered by the users' service provider. Some service providers, such as America Online (AOL), offer nationwide and/or worldwide access networks for their subscribers. However, laptop computers do not provide true mobile Internet access since the laptop's connection to the Internet during any given session is fixed. True mobile access would allow the user to move freely and change the point of connection to the Internet without disrupting service.

Recently, a protocol known as Mobile IP has been developed to allow a mobile terminal, such as a cellular phone or PDA, to access the Internet via a mobile communication network. RFC 2002, a standard proposed by a working group within the Internet Engineering Task Force (i.e., IETF) is one implementation of Mobile IP. This standard solves the problem of host mobility by using two IP addresses: a fixed home address and a "care of" address that changes depending on the location of the mobile terminal. The Mobile IP allows a mobile terminal to wirelessly connect to the Internet or other data network and to roam freely within the network and to change its point of connection to the Internet without disruption of service.

In order to handle packet data traffic, mobile communication networks have evolved from older circuit-switched networks to more modern packet-switched networks. Circuit-switched networks were originally designed to route voice traffic and low throughput data traffic. More modern mobile communication networks use packet-switching technology to provide high rate data services to mobile terminals. These new packet-switched networks allow a mobile terminal to connect to a public data network (PDN), such as the Internet, and maintain the connection as the mobile terminal roams within the network.

The Third Generation Partnership Project 2 (3GPP2) has proposed a standard known as the "3GPP2 Access Network Interfaces Interoperability Specification", A.S0001.1 (June 2000) for a packet-switched mobile communication network. This standard, referred to herein as the 3GPP2 standard, describes a generalized network architecture that might be employed in a packet-switched network or other high data rate network. Mobile terminals communicate via RF signaling with radio base stations (RBSs), which are in turn controlled by one or more base station controllers (BSCs). Each BSC communicates with a packet control function (PCF), which serves as a specialized router that manages traffic going between the various BSCs and a gateway device, such as a high capacity router, connected to the Internet or other PDN. The gateway device, referred to as a packet data serving node (PDSN), and the PCF incorporate a variety of features and processes that allow them to validate, route, and synchronize the IP traffic flowing through the network. IP networks may be used to connect various network components, such as the PCF and PDSN, in a packet-switched network.

The use of IP networks in packet-switched networks makes such packet-switched networks more vulnerable to malicious attackers than circuit-switched networks because the 3GPP2 standard makes frequent use of remote redirection as a way to deal with the mobility of the mobile terminal. For example, the PDSN maintains a routing table that tells the PDSN which PCF to route traffic through for a specific mobile terminal as identified by an International Mobile terminal Identity (IMSI). When the mobile terminal moves from the coverage area of a first PCF, referred to as the source PCF, into the coverage area of a second PCF, referred to as the target PCF, the PDSN must be notified of the change so that it can update its routing table. In this case, the target PCF sends a registration request to the PDSN containing the IMSI of the mobile terminal. When the PDSN receives the registration request from the target PCF, it updates the routing table and initiates a procedure to terminate its connection to the source PCF.

Because the registration request is sent remotely to the PDSN, the PDSN must be certain that the registration request originated with the target PCF and not by a malicious agent. In the absence of well-designed authentication procedures, a malicious agent could cause the PDSN to alter its routing table with erroneous information by sending the PDSN a falsified registration request containing the IMSI of one of the mobile terminals served by the PDSN. The victimized mobile terminal would be unreachable to all incoming communications from the Internet. Further, the malicious agent could redirect packets intended for the victimized mobile terminal to itself.

The protocols used in the packet-switched mobile communication networks include authentication procedures to authenticate registration requests to prevent remote redirection by unauthorized agents. These authentication procedures include measures to fend off what is known as a replay attack. In a replay attack, a malicious agent records a previously-transmitted message which is authenticated by the receiving node and replays the authenticated message at a later date to subvert the authentication protocols. The receiving node, in this instance, might be fooled by the replayed message, which appears authentic to the receiving node. While the standards currently in use include measures to prevent a replay attack directed against the PDSN, a replay attack directed against the PCF is still possible. A replay attack directed against the PCF could cause the PCF to erroneously resynchronize its time clock or to accept and process a replayed message while missing the actual message sent by the PDSN. These erroneous actions could lead to service disruption at the PCF. The present invention provides an authentication procedure to eliminate this potential vulnerability.

SUMMARY OF THE INVENTION

The present invention relates to an authentication procedure that provides replay protection at a PCF. In its role of routing traffic between base stations and a packet data network gateway, such as a PDSN, the PCF sends registration messages to and receives reply messages from the PDSN. With the present invention, the PCF guards against malicious or erroneous replay of otherwise valid reply messages by performing some verification checks on the identification element contained in the registration reply messages.

The identification element of the reply message contains both a message number and a time stamp. The PCF validates both elements. Verification may comprise comparing the identification element of the reply message with the identification element of the corresponding registration message. To be valid the message number of the reply message must match exactly the message number in the corresponding registration message sent by the PCF to the PDSN. The time stamp is considered valid if it identically matches a time stamp in the corresponding registration message sent by the PCF to the PDSN. However, the time stamp is also used to synchronize the PCF's time clock to the PDSN's time clock. Therefore, the time stamp in the reply message may not match exactly the time stamp in the corresponding registration message sent by the PCF to the PDSN. In this case, the reply message is considered valid if the reply message contains a valid message number and the difference between the time stamp in the returned reply message and a reference time (e.g., the PCF's time clock) is within a certain verification threshold. The PCF may optionally check whether the reply message contains an identification mismatch indication as part of the verification. If either of these conditions is not met, the PCF rejects the reply message.

Further bolstering its replay protection, the PCF generates a sequence of message numbers that are inserted into successive registration messages (in the loworder 32-bits of the identification element) sent by the PCF to the PDSN. Reply messages returned by the PDSN must include a valid message number. The sequence of message numbers is generated such that the same message number is not reused during a defined repeat interval that is greater than the verification threshold used by the PCF to validate time stamps in reply messages.

In another aspect of the invention, registration messages generated by the PCF are either accepted or rejected by the PDSN in accordance with standards-defined validation protocols. If the PDSN rejects a registration message based on a mismatch between its reference time and the reference time indicated by a PCF time stamp in the registration message, it returns a reply message to the PCF that contains the PDSN's reference time as well as an 'identification mismatch' indication. In practice, the PCF is meant to use this returned time value to re-synchronize with the PDSN. With the present invention, the PCF validates the PDSN reference time against its reference time to insure that time difference between the two entities does not exceed reasonable bounds. This guards against the PCF synchronizing to an outdated PDSN time stamp contained in a replayed message.

DETAILED DESCRIPTION OF THE INVENTION

Figure 1:
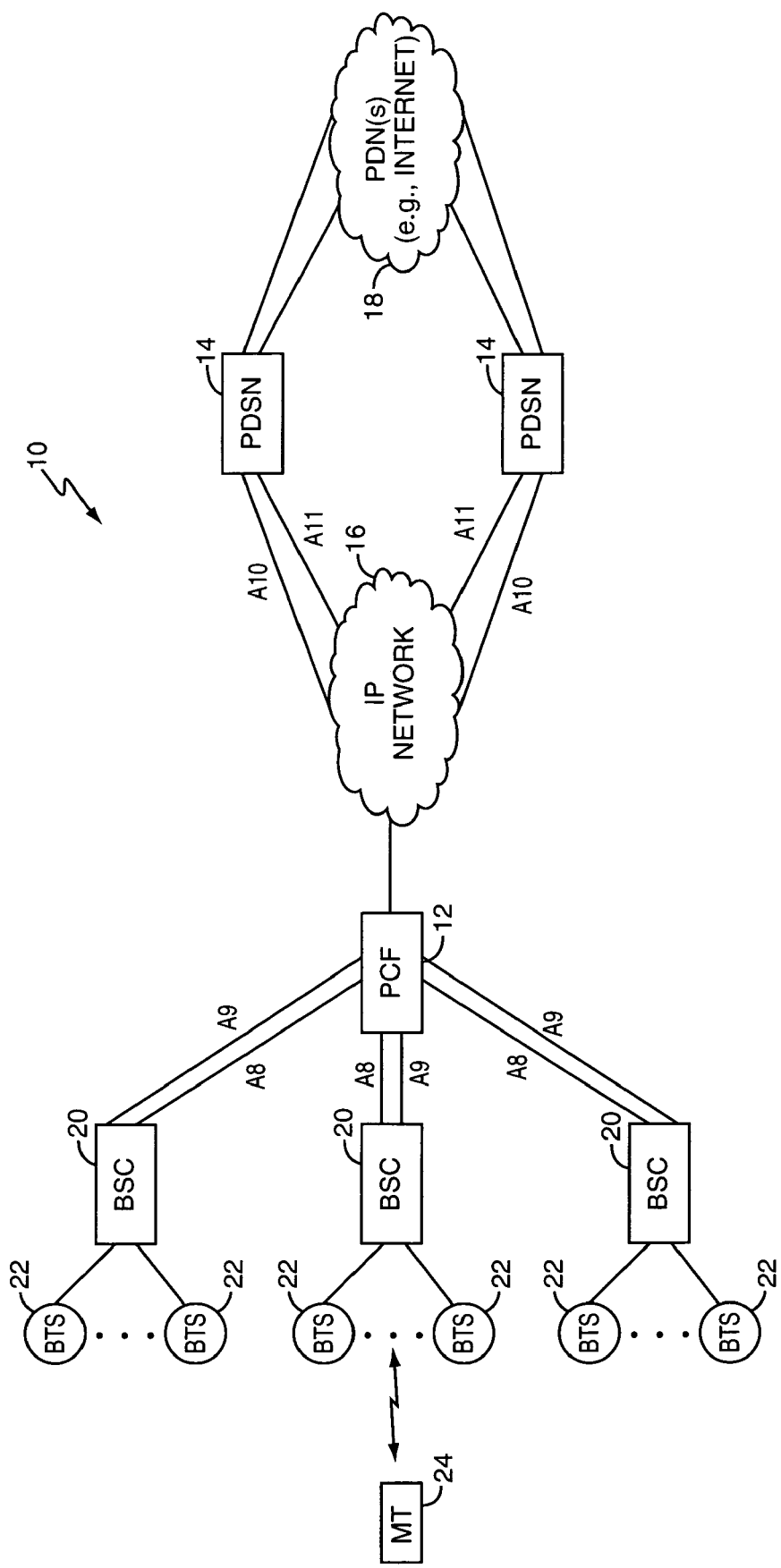
FIG. 1 is a schematic diagram of an exemplary mobile communication network in which the authentication procedure of the present invention is employed.

Referring now to the drawings, FIG. 1 illustrates an exemplary embodiment of a packet-switched mobile communication network, which is indicated generally by the numeral 10. FIG. 1 shows the logical architecture of one possible implementation based on the "3GPP2 Access Network Interfaces Interoperability Specification" (Release A), A.S0001.1 dated June 2000, which is incorporated herein by reference. The logical architecture does not imply any particular physical implementation but illustrates the logical relationship among network components that support mobile communications. The following description is intended to describe how to implement the present invention in an exemplary mobile communication system. Those skilled in the art will recognize that the present invention can be adapted for use in mobile communication systems employing different standards.

The packet-switched mobile communication network 10 includes a plurality of base transceiver stations (BTSs) 22, one or more base station controllers (BSCs) 20, one or more packet control functions (PCFs) 12, and one or more packet data serving nodes (PDSNS) 14. Each BTS 22 communicates with mobile terminals 24 within its coverage area over an air interface. Each BTS 22 is connected to a BSC 20 that supervises the operation of multiple BTSs 22. The BSCs 20 connect to a PCF 12 over the A8/A9 interface and the PCF 12 in turn connects to one or more PDSNs 14 over the A10/A11 interface. The PCFs 12 route traffic between the PDSNs 14 and the BSCs 20. The PDSNs 14 are coupled to one or more public data networks (PDNs) 18, which might be, for example, the Internet or a packet data network.

In operation, the network 10 provides data connections between one or more mobile terminals 24 and the PDN 18. Packet data associated with a given connection (e.g., mobile terminal 24) is routed by the PCF 12 to and from the BSC 20 supporting that given connection. Thus, packet data from the PDN 18 is routed by the appropriate PDSN 14 to the PCF 12, and from there the PCF 12 delivers it to the appropriate BSC 20, which in turn provides the data to the appropriate BTS 22 or BTSs 22 supporting wireless communication with the mobile terminal 24. In reverse, data from a mobile terminal 24 travels via RF signaling to one or more of the BTSs 22, which send it on to the supporting BSC 20. The BSC 20 formats the data appropriately and passes it along to the supporting PCF 12, which in turn routes it through IP network 16 to one of the PDSNs 14, where it is passed along to the PDN 18.

Figure 2:
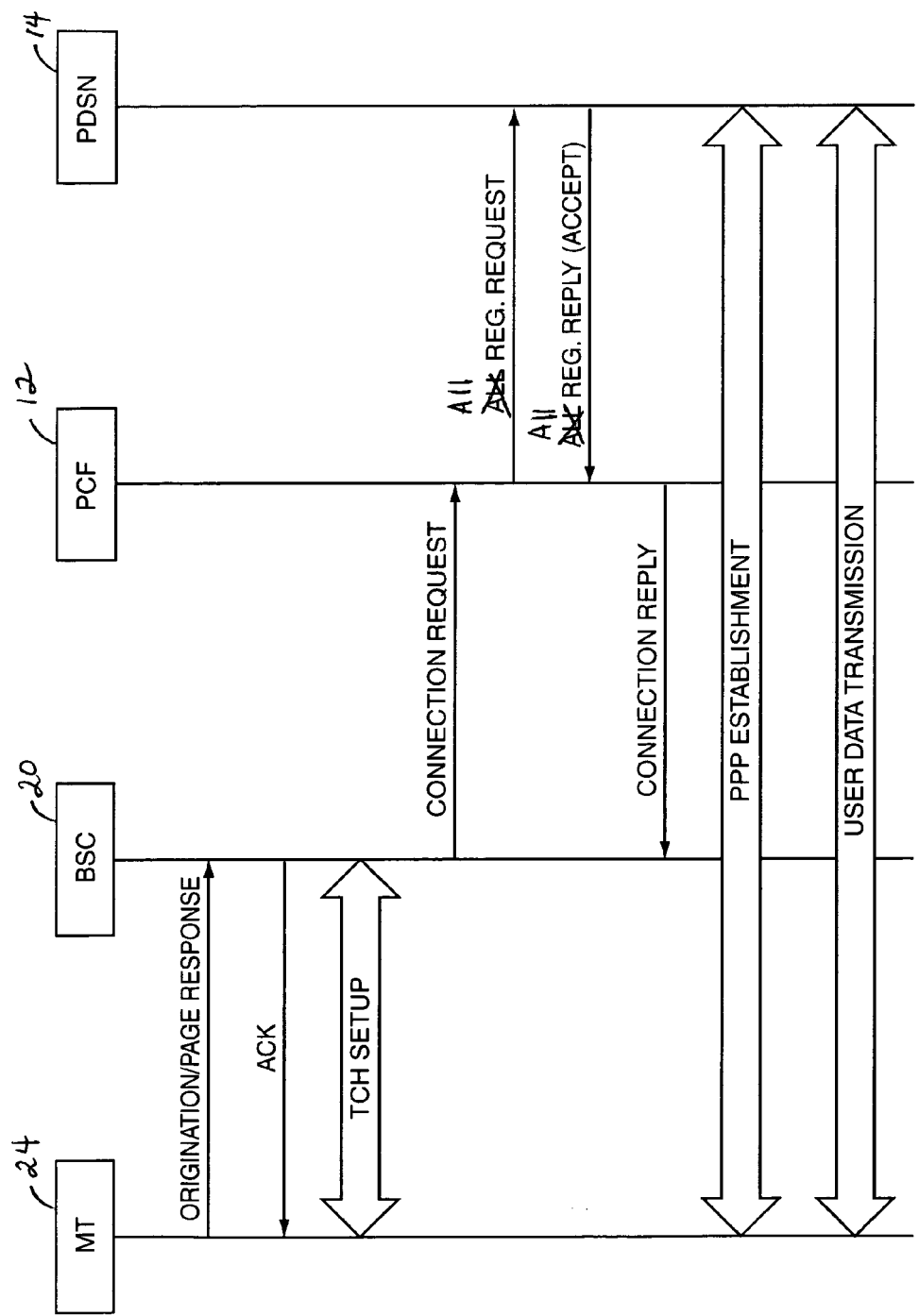
FIG. 2 is a call flow diagram illustrating the messaging to establish a connection between a mobile terminal and a PDSN.

FIG. 2 is a call flow diagram illustrating how a connection between a mobile terminal 24 and the PDSN 14 is established. When the BSC 20 receives an Origination Message or Page Response Message, the BSC 20 acknowledges the request and establishes radio traffic channels for communication with the mobile terminal 24. After establishing traffic channels for communications with the mobile terminal 24, the BSC 20 initiates a connection set-up procedure to set up an A8 connection with the PCF 12 by sending a connection request to the PCF 12. When the PCF 12 receives the connection request from the BSC, the PCF 12 in turn sets up an A10 connection with the PDSN 14 by sending a registration request to the PDSN 14 containing the IMSI of the mobile terminal 24. If the registration request is acceptable, the PDSN 14 returns a registration reply to the PCF 12 with an "accept" indication to establish the A10 connection. The PCF 12 then sends a connection reply to the BSC to establish the A8 connection with the BSC. Once these connections are established, the mobile terminal 24 can begin a PPP establishment procedure with the PDSN 14 to establish a connection with the Internet or other public data network 18.

Once an A10 connection is established for a packet data session, the PCF 12 may be required to periodically register with the PDSN 14 in order to maintain the connection. When the A10 connection is set up, the PDSN 14 may specify the lifetime of the connection in the registration reply. The PCF 12 must then periodically refresh the A10 connection with the PDSN 14 by sending a new A11 registration request to the PDSN 14 before the A10 connection registration lifetime expires. The PDSN 14 returns an A11 registration reply with an "accept" indication, including the refreshed lifetime value for the A10 connection.

Figure 3:
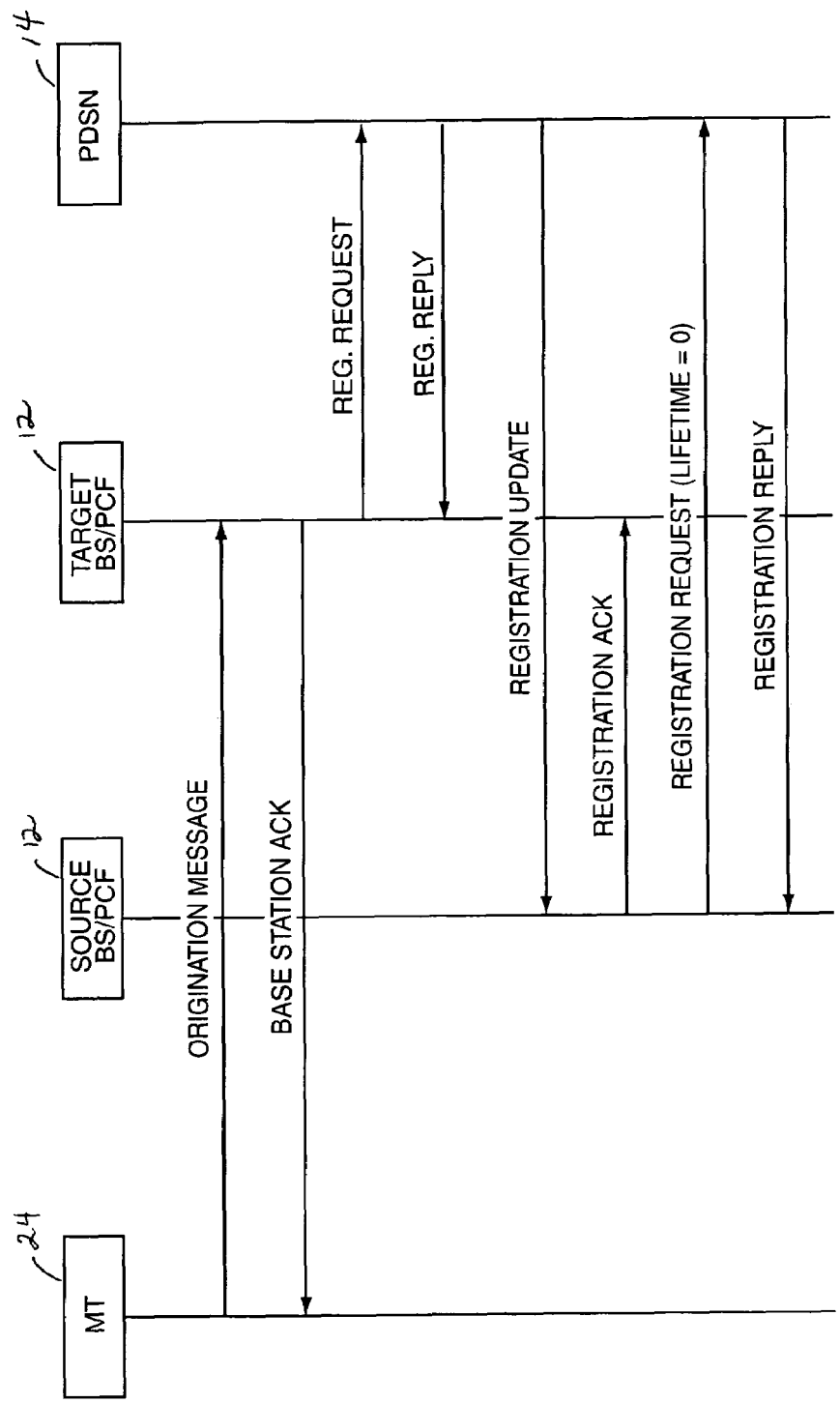
FIG. 3 is a call flow diagram illustrating the messaging to effect an inter-PCF handoff when a mobile terminal moves from one packet control zone to another.

During the lifetime of a packet data session, the mobile terminal 24 may travel between multiple packet zones. A packet zone is the coverage area of a single PCF 12, which may encompass numerous BTSs 22 and BSCs 20. When the mobile terminal 24 travels between packet zones, an inter-PCF hand-off procedure is executed. An exemplary procedure for inter-PCF handoff is shown in FIG. 3. The target base station receives an origination message from the mobile terminal 24 and initiates an A8 connection to the new PCF 12. Upon receipt of the A8 connection request from the target base station, the new PCF 12 sends a registration request to the PDSN 14 to establish an A10 connection to bear the user traffic. In this case, the registration request contains a mobility event indication indicating that a handoff has occurred. If the PDSN 14 accepts the registration request, an A10 connection is established between the new PCF 12 and the PDSN 14. The new PCF 12 then establishes the A8 connection with the target base station to complete the connection between the mobile terminal 24 and the PDSN 14 for the packet data session.

When the PDSN 14 sends a registration reply accepting the registration request from the new PCF 12, it also sends a registration update to the source PCF 12 to initiate closure of the A10 connection with the source PCF 12. After acknowledging the registration update, the source PCF 12 sends a registration request to the PDSN 14 with the lifetime set equal to zero to terminate the A10 connection. The PDSN 14 sends an A11 registration reply to the source PCF 12 and the A10 connection is terminated.

Figure 4:
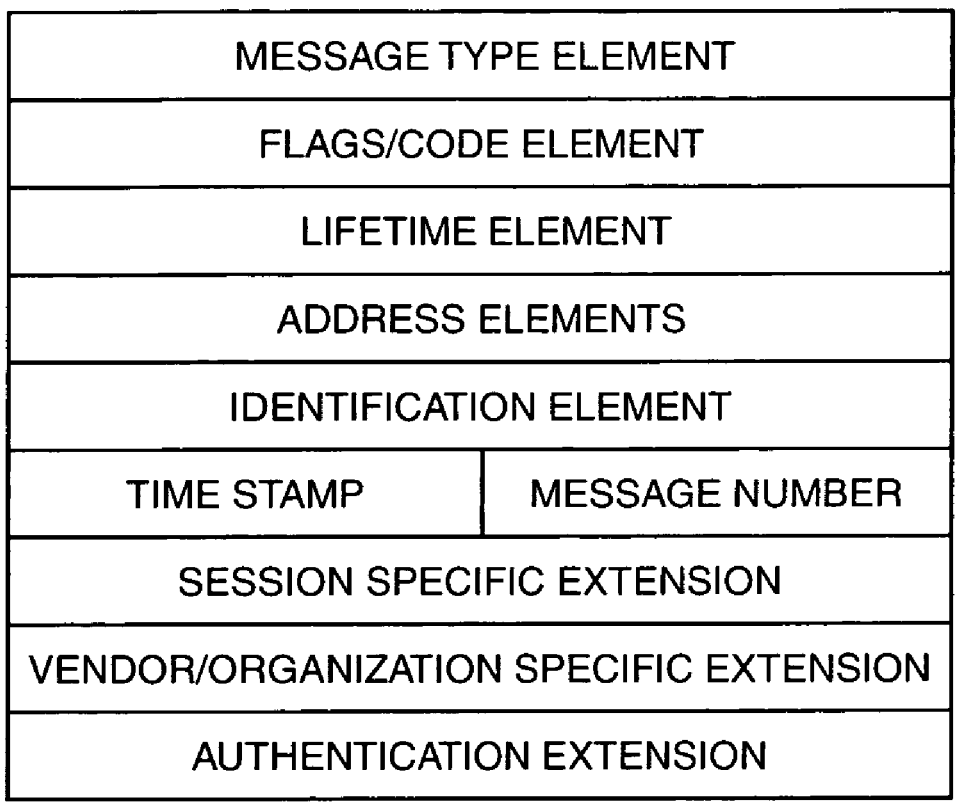
FIG. 4 is a diagram showing the format of an A11 registration message used to manage an A10 connection.

FIG. 4 illustrates the message format used for registration messages. There are four types of registration messages: registration request, registration reply, registration update, and registration acknowledge. Registration request messages are sent by the PCF 12 to the PDSN 14 to establish and maintain an A10 connection and registration reply messages are returned by the PDSN 14 to the PCF 12 accepting or rejecting the registration requests. A registration update message is sent by the PDSN 14 to the PCF 12 to initiate closure of an existing A10 connection and a registration acknowledge message is sent from the PCF 12 to the PDSN 14 to acknowledge a registration update message. FIG. 4 illustrates those elements of a registration message, which are pertinent to the invention. A complete description of the registration message format and the various registration elements can be found in the 3GPP2 standard.

The first information element in a registration message is the message type element. All four types of registration messages include this element, which is one octet in length. The message type element indicates the type of the registration message.

In a registration request message, the message type element is followed by the flags element. The flags element in registration request messages contains a series of one bit flags that determine how A11 messages are interpreted and the characteristics of the A10 connection.

In registration reply messages the flags element is replaced by the code element. The code element in registration reply messages provides the result of registration processing. The code indicates whether a registration message is accepted or rejected and if rejected, the reason associated with the rejection. For example, a code 133 indicates a rejection due to an identification mismatch, which is explained below. In Registration Acknowledge messages, a 'Status' field is available to allow the PCF to indicate to the PDSN the outcome of processing the corresponding Registration Update message.

The flags/code element is followed by the lifetime element in registration request and registration reply messages. The lifetime element, which is two octets in length, indicates the remaining time before an A10 connection registration expires. This element is not used (reserved) in registration update messages.

The address elements follow the lifetime element. The address elements include, for example, the addresses of the PCF 12 and PDSN 14. The address elements provide address information used to route the messages and are not pertinent to the present invention.

All four types of registration messages include an identification element. The identification element follows the address elements and is used to match registration request messages with registration reply messages, and to match registration update messages with registration acknowledge messages. This element is also used to synchronize the PCF's clock to the PDSN 14 and to protect against replay attacks, as will be explained more fully below. The identification element is 64 bits in length and is divided into two parts—a time stamp and a message number. The time stamp comprises the high-order 32 bits of the identification element. The low-order 32 bits contain the message number. The entire 64-bit element is sometimes referred to herein as the identifier.

The identification element is followed by a session specific extension and is present in all registration messages. The session specific extension includes a number of information elements containing session specific information, such as the IMSI of the mobile terminal 24. The session specific extension is not pertinent to the present invention and is not discussed further herein.

The vendor/organization specific extension is an optional extension that is included in registration request messages (following the session specific extension) to send a mobility indicator (and/or accounting information) to PDSN.

All registration messages also include an authentication extension. The authentication extension includes an authentication code, called the authenticator, which is used by the PCF 12 and PDSN 14 for authentication. The authentication code is a 128-bit message digest generated by applying the MD-5 algorithm in "prefix-suffix" mode to the protected elements as will be explained more fully below.

A registration request from a new PCF 12 and an acceptance of such request by the PDSN 14 would result in the re-direction of traffic intended for a mobile terminal 24 from the original PCF 12 to the new PCF 12. Such a registration request is a type of remote re-direction, which is widely understood in the Internet community to be a security problem if not properly authenticated. If the PDSN 14 did not authenticate registration requests, a malicious agent masquerading as a PCF 12 could send a falsified registration request causing the PDSN 14 to update its routing tables with erroneous address information. The mobile terminal 24 victimized by the masquerading entity would, in this case, be unreachable and would not be able to receive packet data from the PDN network 18.

The RFC 2002 standards, which have been incorporated into the 3GPP2 standard, include an authentication procedure to protect against falsified registration requests. Each registration request sent by the PCF 12 to the PDSN 14 includes an authentication extension, which contains an authentication code as previously described. The authentication code serves as a signature that can be verified by the PDSN 14. The authentication code is computed by concatenating the registration request with a shared secret known only to the PCF 12 and the PDSN 14 and then hashing the registration request along with the shared secret. The authentication code is appended to the registration request that is transmitted over the A10/A11 interface to the PDSN 14. When a registration request is received by the PDSN 14, the PDSN 14 re-computes the authentication code based on the received registration request and its a priori knowledge of the shared secret. The recomputed authentication code is compared to the received authentication code. If the codes match, the registration request is authenticated. Without knowledge of the shared secret, a malicious agent cannot generate a valid registration request. The PCF 12 also authenticates the registration reply in the same fashion.

The authentication procedures described in the standard also include measures to prevent what is known as a replay attack. In a replay attack, a malicious agent records a message and uses it at a later time to subvert the authentication protocols. A malicious agent could, for example, record a valid registration request message sent from the PCF 12 to the PDSN 14 and send the recorded registration request at a later time to the PDSN 14. The replayed registration request would, in this case, contain a valid authentication code since it was generated by a PCF 12.

To prevent this type of replay attack, the registration request includes a 64-bit identification element, called the identifier, that changes with every new registration. The identification element is used by the PDSN 14 to verify that a registration message has been freshly generated by the PCF 12 and not replayed by a malicious agent. Two types of replay protection are described in the RFC 2002 standard. The first method relies on a time stamp in the identification element. The second method relies on a nonce in the identification element. Under the current standards, the PDSN 14 and PCF 12 are required to implement time-based replay protection. Nonce-based replay protection is optional.

The basic principle of time stamp replay protection is that the node generating a message inserts the current time of day into the message, and the node receiving the message checks that this time stamp is sufficiently close to its own time of day. The two nodes must have adequately synchronized time-of-day clocks. When sending a registration request, the PCF 12 places a time stamp in the high order 32-bits of the identification element. The identification element is among the elements protected by the authentication code and therefore cannot be changed by the malicious agent without knowledge of the shared secret. The time stamp is the current time specified in Universal Time Coordinated (UTC) time. The low order 32-bits could comprise either the fractional seconds associated with the current time or a pseudo-random number. The value placed in the identification element of a registration request must increase monotonically. That is, the value placed in the identification element of the registration request must be greater than that used in any previous registration request, since the PDSN 14 uses the value in the identification element as a sequence number. Upon receipt of a registration request with a valid authentication code, the PDSN 14 checks the identification element for validity. In order to be valid, the time stamp contained in the identification element must be within a specified limit to the PDSN 14's current time (e.g., seven seconds) and the value of the identification element must be greater than that of all previously-accepted registration requests from that particular PCF 12.

If the time stamp is valid, the PDSN 14 copies the entire identification element into a registration reply and returns the registration reply to the PCF 12. If the time stamp is not valid, the PDSN 14 copies only the low order 32-bits into the registration reply and supplies its own current time in the high order 32-bits. In this latter case, the PDSN 14 returns a code 133 (identification mismatch) in the code element of the registration reply. The PCF 12 verifies that the low order 32-bits in the registration reply match the low order 32-bits in the registration request. If the registration reply contains a code 133, the PCF 12 uses the high order 32-bits of the registration reply to synchronize its clock to the PDSN 14 and transmits a new registration request to the PDSN 14.

Even with the authentication procedures described above, a replay attack directed against the PCF 12 is still possible since the PCF 12 only verifies the low order 32-bits, which may repeat. That is, the existing authentication protocol does not insure that the low order 32-bits are unique, leaving the PCF 12 vulnerable to a replay attack. The authentication procedures described in the RFC 2002 standard were originally developed to perform authentication between a mobile terminal and a home agent. The number of registration requests generated by a mobile terminal is small so the likelihood of two registration requests from the same mobile terminal having identical low order 32-bits is highly unlikely. However, the PCF 12 may process millions of calls during each month. Thus, the likelihood of two registration requests from the same PCF 12 having identical low order 32-bits is much greater in this context. The present invention provides a procedure to prevent replay attacks directed against the PCF 12.

According to the present invention, the PCF 12 authenticates the registration reply based not only on the low order 32-bits, but also based on the time stamp contained in the registration reply (i.e. PCF uses entire 64 bits of the identification element). To verify that a reply is valid (and not a replay), the PCF checks that the entire 64-bits of the identification element (timestamp plus low-order 32-bits) in the registration reply match the 64-bit identification element in the corresponding registration message. In the case where only the low-order 32-bits match, the PCF checks that the registration reply contains a code 133 (identification mismatch) and that the difference between the timestamp in the reply and a reference time at the PCF is within a verification threshold. The verification threshold represents the limit of the permissible time differential. If, for example, the verification threshold represents a thirty minute time differential, the PCF 12 compares the time stamp returned by the PDSN 14 to a time reference. The time reference may be the current time as reflected by the base PCF time clock. Alternatively, the time stamp inserted by the PCF 12 into the high order 32-bits of a corresponding registration request may be used as a time reference. If the time differential between the time stamp returned by the PDSN 14 and the time reference is greater than thirty minutes, the PCF 12 rejects the registration reply.

The verification threshold is chosen so that the permissible time differential exceeds by several times the greatest expected time differential. In general, the time differential should be a small value, typically in the order of seconds or minutes. Assuming that the time clocks in the PCF 12 and PDSN 14 are set properly, a time differential exceeding ten minutes would be rare. Therefore, it could be assumed that ten minutes is the greatest expected time differential. In this case, the operator may chose the verification threshold to be a small integer multiple of ten minutes.

Using the time stamp contained in the registration reply to authenticate the registration reply provides protection from a replay attack directed against the PCF 12. For a replay attack to be successful, the PCF 12 would have to send two separate registration requests with identical low-order 32-bits in the permissible time window; an event with an extremely low probability of occurrence. Using a sequence generator to generate the message number that is inserted into the low order 32-bits can foreclose even this unlikely possibility. The sequence generator ensures that all registration requests generated by the PCF 12 during a defined repeat interval will contain a unique message number. The repeat interval is the interval during which all values in generated sequence must be unique. The repeat interval for the sequence generator is chosen so that it is greater than the verification threshold used by the PCF 12. Thus, the PCF 12 will be able to detect any replay attack based on the returned time stamp in the registration reply.

A simple sequence generator would be a function that increments the value of the message number in each successive registration request. For example, if the value of the message number is incremented by 1 in each successive registration request, a sequence of length $2^{32}$ would be generated. If the PCF 12 processed on average 100,000 registration requests per week, the sequence of message numbers generated by the sequence generator would not repeat for approximately 430,000 days. Since the verification threshold will typically be in the order of thirty minutes, there is no need to generate a message number sequence with such a long repeat interval. All that is required is that the repeat interval be greater than the verification threshold. Thus, a repeat interval measured in hours or days would protect against replay attacks directed against the PCF 12.

In the example given above, where the sequence generator increments the message number by one on each successive registration request, all possible values for the message number are used before any message number is repeated. Thus, the length of the message number sequence (i.e., the repeat interval) is equal to the number of possible values, which is $2^{32}$. It is not necessary, however, that the sequence generator cycle through all possible values for the message numbers. For example, the sequence generator could generate a monotonically-increasing message number sequence by adding a random number between 0 and 999 to the previously used message number. Assuming that the added value is randomly chosen, it may be assumed that the message number will increase on average by 500 on each successive registration request. In this case, the sequence of message numbers without a repeated message number would contain approximately 8.6 million values out of possible 232 values. Again, assuming that the PCF 12 processes 100,000 registration requests per day, this would provide a repeat interval of approximately 86 days. Incrementing the message number by a randomly-chosen value adds an element of randomness to the message number sequence so that it is not possible to predict the next message number based on the previous message number with any degree of certainty.

In both of the examples given above, the message number sequence generated by the sequence generator increases monotonically until the sequence generator rolls over (i.e., runs out of values). It is not necessary for the message number to increase monotonically. The sequence of message numbers could hop forward and backward in a pseudo-random manner. However, the standards require the value of the entire identification element to increase monotonically with each successive registration request. The high order 32-bits contain a time stamp which specifies the current UTC time in seconds. It is possible that the PCF 12 could generate multiple registration requests in a single second. Thus, the sequence generator would need to ensure that the message number increases monotonically during a single interval of the high order 32-bits. The high order 32-bits always increase monotonically. After the high order 32-bits is incremented, the next message number may be any of the $2^{32}$ possible values. All message numbers generated after the first message number during a single interval of the high order 32-bits must be greater than the previous value. Such a scheme can be implemented using two generator functions. The sample space of the first generator function would contain all possible values that have not been previously used during the same repeat interval. The sample space for the second generator function would comprise the subset of the first sample set greater than the previously-generated message number. Using this method satisfies the requirement in the standards that the value of the entire identification element increase monotonically. At the same time, the value of the message number could hop forward and backward in a pseudo-random fashion that gives an appearance of randomness.

Figure 5:
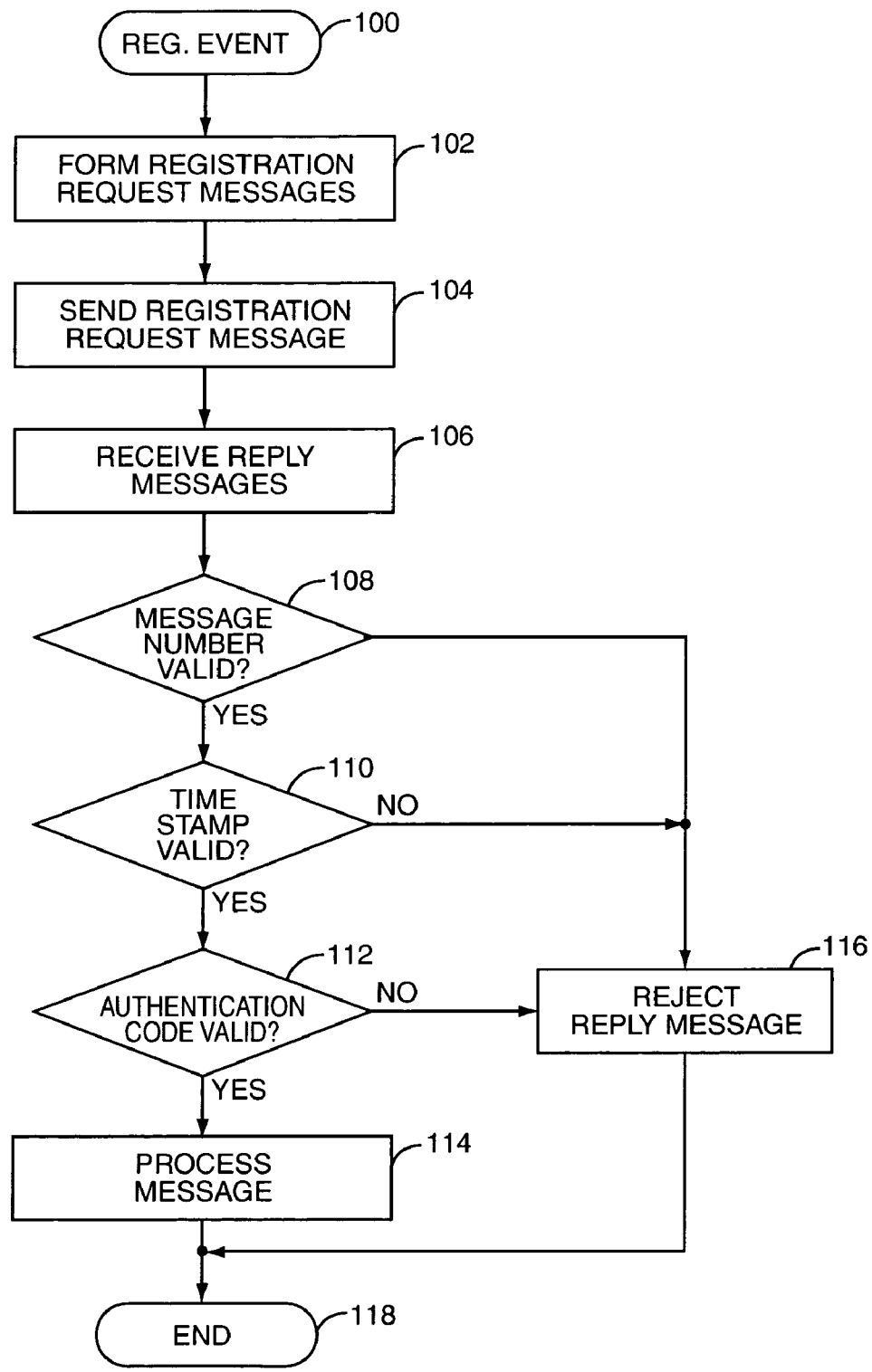
FIG. 5 is a flow diagram illustrating the authentication procedure of the present invention.

FIG. 5 is a flow diagram illustrating an authentication procedure according to the present invention. The authentication procedure is triggered by a registration event at block 100. The registration event may, for example, be triggered by a connection request. In response to the registration event, the PCF 12 forms a registration request message containing a 64-bit identifier at block 102. As explained above, the high-order 32 bits of the identifier comprises a time stamp indicative of the current time and the low-order 32 bits comprise the message number. At block 104, the PCF 12 transmits the registration request message over the A11 interface to the PDSN 14. At block 106, the PCF 12 receives a registration reply from the PDSN 14, which the PCF 12 must authenticate. At blocks 108 and 110, the PCF 12 performs validation checks to ensure that the registration reply is a valid response from the PDSN 14 to a recently transmitted registration request and is not a replay of a previous valid registration reply. In particular, the PCF 12 validates the message number at block 108 by comparing the message number in the registration reply to the message number contained in the registration request message. If the message number does not match that contained in a registration request, the reply message is rejected (block 116) and the procedure ends (block 118). If the message number is valid, the PCF 12 validates the time stamp contained in the registration reply at block 110 as follows. If the time stamp in the registration reply matches the time stamp sent in the registration request, the registration reply is considered valid and passed for authentication (block 112). If the time stamp in the registration reply does not match the time stamp sent in the registration request and the registration reply contains code 133 (identification mismatch), the PCF computes the time difference between the returned time stamp and a reference time. If the computed time difference is less than the verification threshold, the registration reply is considered valid and passed for authentication (block 112). If the computed time difference is more than the verification threshold or registration reply does not contain code 133, the registration reply is considered invalid and rejected (block 116) and the procedure ends (block 118). To authenticate the message (block 112), the PCF validates the authentication code returned with the registration reply by re-generating the authentication code and comparing the regenerated authentication code with the returned authentication code. If the two match, the reply is considered to have passed authentication and is further processed (block 114). Otherwise, the registration reply is rejected (block 116) and the authentication procedure ends (block 118).

The processing that takes place in block 114 may include, for example, synchronization of the PCF's time clock to the PDSN 14 when a code 133 (i.e., identification mismatch) is returned in the registration reply or taking some other action when a code other than 133 is returned. In the case where code 133 is returned, the PCF 12 uses the returned time stamp in the registration reply to adjust its own time clock for future communications with the PDSN 14. Thus, the authentication procedure of the present invention helps prevent erroneous resynchronization at the PCF 12 due to a replay attack (in the case where the message number matches and code 133 is present in the reply). The present invention also prevents PCF from mistakenly accepting a replayed reply message and thereby missing the actual reply message (in the case where message number matches and a code other than 133 is present in the reply).

What is claimed is:

1. A method of authenticating registration reply messages received by a PCF that are purportedly responsive to registration messages previously sent by the PCF to a PDSN, said method comprising:
   determining a verification threshold for validating time stamps in registration reply messages;
   generating a sequence of message numbers for sequential use in a series of successive registration messages sent by said PCF to said PDSN, said sequence of message numbers having a repeat interval greater than said verification threshold;
   inserting said sequential message numbers into successive registration messages sent by said PCF to said PDSN;
   receiving a registration reply message at said PCF presumptively sent by said PDSN in response to a registration message previously sent by said PCF, said registration reply message containing a time stamp and a message number;
   validating said message number in said registration reply message by comparing said message number in said registration reply message to the message number in a corresponding registration message sent by said PCF;
   if said message number is valid, validating said time stamp in the said registration reply.

2. The method of claim 1 wherein validating said time stamp in said registration reply message comprises computing an age of said registration reply message based on said time stamp in said registration reply message and accepting said registration reply message if said age is less than a verification threshold.

3. The method of claim 2 wherein computing the age of said registration reply message comprises computing a time difference between said time stamp in said registration reply message and a time reference.

4. The method of claim 2 wherein computing the age of said registration reply message comprises computing a time difference between said time stamp in said registration reply message and a time stamp in a corresponding registration message.

5. The method of claim 1 wherein validating said time stamp in said registration reply message comprises:
   comparing said time stamp in said registration reply message to the time stamps in one or more registration messages sent by said PCF;
   accepting said registration reply message if said time stamp in said registration reply message equals the time stamp in a corresponding registration message;
   if said time stamp in said registration reply message does not equal the time stamp in said corresponding registration message, computing an age of said registration reply message based on said time stamp in said registration message;
   accepting said registration reply message if said age of said registration reply message is less than a verification threshold.

6. The method of claim 5 wherein computing an age of said registration reply message based on said time stamp in said registration reply message is performed conditionally only if:
   said registration reply message contains a predetermined code; and
   said time stamp in said registration reply message does not equal said time stamp in said registration message; and
   wherein said registration reply message is rejected if said predetermined code is not present and said time stamp in said registration reply message does not match said time stamp in said registration message.

7. The method of claim 1 further comprising maintaining a time reference in said PCF.

8. The method of claim 7 further comprising synchronizing said time reference to a time clock located at said PDSN.

9. The method of claim 8 wherein synchronizing said time reference to a time clock located at said PDSN comprises determining a difference between said time reference and said PDSN time clock.

10. The method of claim 8 wherein validating said time stamp in said registration reply message comprises computing an age of said registration reply message based on said time stamp in said registration reply message and accepting said registration reply message if said age is less than a verification threshold.

11. The method of claim 10 wherein computing the age of said registration reply message comprises computing a time difference between said time stamp in said registration reply message and a time stamp in a corresponding registration message.

12. The method of claim 10 wherein computing the age of said registration reply message comprises computing a time difference between said time stamp in said registration reply message and said time reference.

13. The method of claim 1 wherein generating a sequence of message numbers comprises incrementing said message number in each successive registration message sent by said PCF to said PDSN.

14. The method of claim 13 wherein incrementing said message number in each successive registration message sent by said PCF to said PDSN comprises adding a random number to a previous message number.

15. The method of claim 13 wherein said sequence of message numbers increases monotonically.

16. A method of authenticating a second registration message received by a PCF that is purportedly responsive to a first registration message previously sent by the PCF to the PDSN, said method comprising:
   inserting a message number into said first registration message;

sending said first registration message from said PCF to said PDSN;

receiving said second registration message at said PCF responsive to said first registration message, said second registration message containing a time stamp and said message number from said first registration message;

authenticating said second registration message based on said message number and said time stamp by validating said message number in said second registration message and if said message number is valid, validating said time stamp in said second registration message, wherein validating said time stamp in said second registration message comprises:

comparing said time stamp in said second registration message to said time stamp in said first registration message;

accepting said second registration message if said time stamp in said second registration message equals said time stamp in said first registration message;

if said time stamp in said second registration message does not equal said time stamp in said first registration message, computing an age of said second registration message based on said time stamp in said first registration message; and accepting said second registration message if said age of said second registration message is less than a verification threshold.

17. The method of claim 16 wherein computing an age of said second registration message based on said time stamp in said second registration message is performed conditionally only if:

said second registration message contains a predetermined code; and said time stamp in said second registration message does not equal said time stamp in said first registration message; and wherein said second registration message is rejected if said predetermined code is not present and said time stamp in said second registration message does not match said time stamp in said first registration message.

18. The method of claim 16 further comprising maintaining a time reference in said PCF.

19. The method of claim 18 further comprising synchronizing said time reference to a time clock located at said PDSN.

20. The method of claim 19 wherein synchronizing said time reference to a time clock located at said PDSN comprises determining a difference between said time reference and said PDSN time clock.

21. The method of claim 19 wherein validating said time stamp in said second registration message comprises computing the age of said second registration message and comparing said age to a verification threshold.

22. The method of claim 21 wherein computing the age of said second registration message comprises computing a time difference between said time stamp in said second registration message and said time reference.

23. The method of claim 19 further comprising generating a time stamp for said first registration message sent by said PCF to said PDSN based on said time reference.

24. The method of claim 23 wherein computing the age of said second registration message comprises computing a time difference between said time stamp in said second registration message and said time stamp in said first registration message.

25. A method of guarding against erroneous re-synchronization of a first reference time used by a packet control function (PCF) to time-stamp messages sent to a packet data serving node (PDSN) with a second reference time used by said PDSN in validating said messages sent by said PCF, the method comprising:

receiving a message presumptively from said PDSN at said PCF indicating that said first reference time requires re-synchronization with said second reference time, said message containing a PDSN time value;

comparing said PDSN time value with said first reference time to determine a time difference; and adjusting said first reference time based on said PDSN time value if said time difference does not exceed a pre-determined time threshold.

26. The method of claim 25 wherein receiving a message presumptively from said PDSN at said PCF indicating that said first reference time requires re-synchronization with said second reference time comprises receiving a registration reply message purportedly responsive to a registration message previously sent by said PCF to said PDSN.

27. The method of claim 26 wherein said registration message includes an identifier, comprising a PCF time stamp and a message number, and further comprising verifying that said registration reply message contains a matching message number.

28. The method of claim 27 wherein said message number in said registration message is part of sequence of message numbers with a repeat interval greater than said pre-determined time threshold.

29. The method of claim 25 further comprising:

maintaining a base PCF time at said PCF; and determining said first reference time at said PCF by adjusting a copy of said base PCF time in accordance with said PDSN time value.

30. The method of claim 29 further comprising synchronizing said base PCF time with a network-based time.

31. A method of authenticating a second registration message received by a PCF that is purportedly responsive to a first registration message previously sent by the PCF to the PDSN, said method comprising:

inserting a message number into said first registration message;

sending said first registration message from said PCF to said PDSN;

receiving said second registration message at said PCF responsive to said first registration message, said second registration message containing a time stamp and said message number from said first registration message;

authenticating said second registration message based on said message number and said time stamp by validating said message number in said second registration message and if said message number is valid, validating said time stamp in said second registration message, wherein validating said time stamp in said second registration message comprises: computing the age of said second registration message by computing a time difference between said time stamp in said second registration message and a time stamp in said first registration message; and comparing said time difference to a the verification threshold; and accepting said second registration message if said second registration message contains a valid message number and a valid time stamp.

* * * * *

UNITED STATES PATENT AND TRADEMARK OFFICE
CERTIFICATE OF CORRECTION

PATENT NO. : 7,116,668 B2
APPLICATION NO. : 09/973421
DATED : October 3, 2006
INVENTOR(S) : Sivalingham It is certified that error appears in the above-identified patent and that said Letters Patent is hereby corrected as shown below:

On the Title Page item (73), under "Assignee", in Column 1, Line 1, delete "Telefunaktiebolaget" and insert -- Telefonaktiebolaget --, therefor.

In FIG. 2. Sheet 2 of 5, under Tag "14", delete "All REG. REQUEST" and insert -- All REG. REQUEST --, therefor.

In FIG. 2. Sheet 2 of 5, under Tag "14", delete "All REG. REPLY (ACCEPT)" and insert -- All REG. REPLY (ACCEPT) --, therefor.

In Column 4, Line 24, delete "(PDSNS)" and insert -- (PDSNs) --, therefor.

In Column 14, Line 60, in Claim 31, delete "a the" and insert -- a --, therefor.

Signed and Sealed this

Twenty-ninth Day of April, 2008

JON W. DUDAS
*Director of the United States Patent and Trademark Office*